United States Patent
Haykinson et al.

(10) Patent No.: US 9,769,546 B2
(45) Date of Patent: Sep. 19, 2017

(54) PREVIEW IMAGE PROCESSING USING A BUNDLE OF PREVIEW IMAGES

(71) Applicant: Hulu, LLC, Santa Monica, CA (US)

(72) Inventors: Ilya Haykinson, Santa Monica, CA (US); Jeffrey Fan, Pasadena, CA (US); Bao Lei, San Bruno, CA (US); James Guan, Mountain View, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 14/446,118

(22) Filed: Jul. 29, 2014

(65) Prior Publication Data
US 2015/0040161 A1    Feb. 5, 2015

Related U.S. Application Data

(60) Provisional application No. 61/861,195, filed on Aug. 1, 2013.

(51) Int. Cl.
*H04N 21/8549*    (2011.01)
*H04N 21/472*    (2011.01)

(52) U.S. Cl.
CPC ... *H04N 21/8549* (2013.01); *H04N 21/47217* (2013.01)

(58) Field of Classification Search
None
See application file for complete search history.

(56) References Cited

U.S. PATENT DOCUMENTS

| | | |
|---|---|---|
| 5,832,494 A | 11/1998 | Egger et al. |
| 5,889,506 A | 3/1999 | Lopresti et al. |
| 6,199,082 B1 | 3/2001 | Ferrel et al. |
| 6,310,648 B1 | 10/2001 | Miller et al. |
| 6,597,375 B1 | 7/2003 | Yawitz |
| 6,988,244 B1 | 1/2006 | Honda et al. |

(Continued)

FOREIGN PATENT DOCUMENTS

| | | |
|---|---|---|
| EP | 1197020 | 11/2007 |
| GB | 2323489 | 9/1998 |

(Continued)

OTHER PUBLICATIONS

"Gotuit Announces Integration with DoubleClick,"http:www.gotuit.com/press/2008/1022_DoubleClick.html, 1 page.

(Continued)

*Primary Examiner* — Omar S Parra
(74) *Attorney, Agent, or Firm* — Fountainhead Law Group P.C.

(57) ABSTRACT

In one embodiment, a method sends a request for a bundle of preview images for a video to a server. The video is played and a portion of the bundle of preview images for the video is received. The method decodes the portion of the bundle of preview images before the entire bundle of preview images is received. Then, an input from a user for a location in the video is received and the method determines if a preview image corresponding to the location has been decoded from the bundle of preview images. When the image corresponding to the location has been decoded, the preview image corresponding to the location is displayed as a preview image.

24 Claims, 9 Drawing Sheets

(56) References Cited

U.S. PATENT DOCUMENTS

| | | |
|---|---|---|
| 2002/0075572 A1* | 6/2002 | Boreczky .......... H04N 7/17336 359/722 |
| 2002/0104096 A1 | 8/2002 | Cramer et al. |
| 2002/0188621 A1 | 12/2002 | Flank et al. |
| 2004/0071453 A1 | 4/2004 | Valderas |
| 2004/0080528 A1 | 4/2004 | Rand et al. |
| 2004/0189692 A1 | 9/2004 | Tojo et al. |
| 2004/0268413 A1 | 12/2004 | Reid et al. |
| 2005/0071881 A1 | 3/2005 | Deshpande |
| 2005/0086703 A1 | 4/2005 | Gupta et al. |
| 2005/0193015 A1 | 9/2005 | Logston et al. |
| 2006/0015925 A1 | 1/2006 | Logan |
| 2006/0190808 A1 | 8/2006 | Balthaser |
| 2006/0259589 A1 | 11/2006 | Lerman et al. |
| 2007/0016611 A1 | 1/2007 | Wang |
| 2007/0088844 A1 | 4/2007 | Seims |
| 2007/0110399 A1 | 5/2007 | Roh |
| 2007/0174791 A1 | 7/2007 | Park et al. |
| 2007/0244900 A1 | 10/2007 | Hopkins et al. |
| 2008/0022230 A1 | 1/2008 | Ogawa et al. |
| 2008/0060001 A1 | 3/2008 | Logan et al. |
| 2008/0066107 A1 | 3/2008 | Moonka et al. |
| 2009/0024927 A1 | 1/2009 | Schrock et al. |
| 2009/0070675 A1 | 3/2009 | Li |
| 2009/0083781 A1 | 3/2009 | Yang et al. |
| 2009/0249423 A1* | 10/2009 | Li ................... H04N 7/17336 725/116 |
| 2010/0082585 A1 | 4/2010 | Barsook et al. |
| 2010/0150520 A1 | 6/2010 | Hopwood et al. |
| 2010/0251121 A1 | 9/2010 | Rosser et al. |
| 2010/0303440 A1* | 12/2010 | Lin ...................... H04N 5/76 386/241 |
| 2012/0321280 A1* | 12/2012 | Lin ..................... G11B 27/105 386/240 |
| 2013/0080895 A1* | 3/2013 | Rossman ............ G06F 3/04883 715/720 |
| 2014/0082661 A1* | 3/2014 | Krahnstoever ...... H04N 21/435 725/32 |

FOREIGN PATENT DOCUMENTS

| | | |
|---|---|---|
| GB | 2443959 | 5/2008 |
| WO | 0058940 | 10/2000 |
| WO | 2005001656 | 1/2005 |
| WO | 2005003899 | 1/2005 |
| WO | 2007030621 | 3/2007 |
| WO | 2007030751 | 3/2007 |
| WO | 2007130472 | 11/2007 |
| WO | 2008011091 | 1/2008 |

OTHER PUBLICATIONS

"Gotuit Publishes White Paper: 'The Currency of Internet Video,'" http://www.gotuit.com/press/2008/1028_Whitepaper_CurrencyOfInternetVideo.html, 1 page.

"The Currency of Internet Video: The Importance of Quality Metadata in Monetizing Internet Video," Gotuit White Paper, Oct. 2008, pp. 1-13.

"Gotuit and Pixsy Raise the Bar on Video Search," http://www.gotuit.com/press/2008/0930_Pixsy.html, 3 pages.

\* cited by examiner

PREVIEW IMAGE PROCESSING USING A BUNDLE OF PREVIEW IMAGES

CROSS REFERENCES TO RELATED APPLICATIONS

This application claims the benefit of U.S. Provisional Patent Application No. 61/861,195, filed Aug. 1, 2013 and entitled "PREVIEW IMAGE PROCESSING USING A BUNDLE OF PREVIEW IMAGES", which is incorporated by reference in its entirety for all purposes.

BACKGROUND

When playing a video on a device, such as a mobile device, a user may scrub a timeline, such as by holding and dragging his/her finger across a content playback timeline. In scrubbing the timeline, the user moves his/her finger to a different position (e.g., time) than the current time in the video being played. The device tracks the user's finger and displays a user interface widget, which may include a progress indicator, that shows the content time offset corresponding to the position in which the user has dragged his/her finger. The user interface widget also contains a space for a preview image. The device can decide to fetch and display a preview image within the user interface widget. To fetch the image, the device transmits a current content identifier and a time offset corresponding to the position of the user's finger to a server. The server then responds with an image for that time offset. If the user moves his/her finger to multiple positions on the timeline, the device may send many requests for images to the server. Each image request may take a significant amount of time due to network connection latency, especially with multiple requests competing for bandwidth.

SUMMARY

In one embodiment, a method sends a request for a bundle of preview images for a video to a server. The video is played and a portion of the bundle of preview images for the video is received. The method decodes the portion of the bundle of preview images before the entire bundle of preview images is received. Then, an input from a user for a location in the video is received and the method determines if a preview image corresponding to the location has been decoded from the bundle of preview images. When the image corresponding to the location has been decoded, the preview image corresponding to the location is displayed as a preview image.

In one embodiment, a non-transitory computer-readable storage medium contains instructions, that when executed, control a computer system to be configured for: sending a request for a bundle of preview images for a video to a server; starting to play the video; receiving a portion of the bundle of preview images for the video; decoding the portion of the bundle of preview images before the entire bundle of preview images is received; receiving an input from a user for a location in the video; determining if a preview image corresponding to the location has been decoded from the bundle of preview images; and when the image corresponding to the location has been decoded, displaying the preview image corresponding to the location as a preview image.

In one embodiment, a method includes: determining, by a computing device, a request for a bundle of preview images for a video; sending, by the computing device, the video to a client device for playing; and sending, by the computing device, a portion of the bundle of preview images for the video, wherein the client device starts to decode the portion of the bundle of preview images before the entire bundle of preview images is received and displays a preview image corresponding to a location that a user seeked to in the video as a preview image when an image corresponding to the location has been decoded from the bundle of preview images.

The following detailed description and accompanying drawings provide a better understanding of the nature and advantages of particular embodiments.

DETAILED DESCRIPTION

Described herein are techniques for a system to display preview images. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a bundle of preview images for a media program. For example, the bundle may include a preview image for every second of the media program. Encoded preview images may be included in a bundle file that is sent from a server to a client device. The client device may decode the bundle file into the individual preview images and store the preview images locally.

When a user seeks to a different time during the playback of the media program, the client device may display a preview image. However, to display the preview image, the client device must have decoded the preview image from the bundle. In particular embodiments, instead of the client device waiting for the full bundle to be received, the client device decodes individual preview images of the bundle file as the preview images arrive. If the seek is to a position in which the client device has already decoded a preview image, the client device can display the preview image. This allows the client device to display preview images even when the client device has not received and decoded the full bundle file. Other enhancements may also be appreciated. For example, the client device can request a bundle file with a different frequency of images or a different quality.

Figure 1:
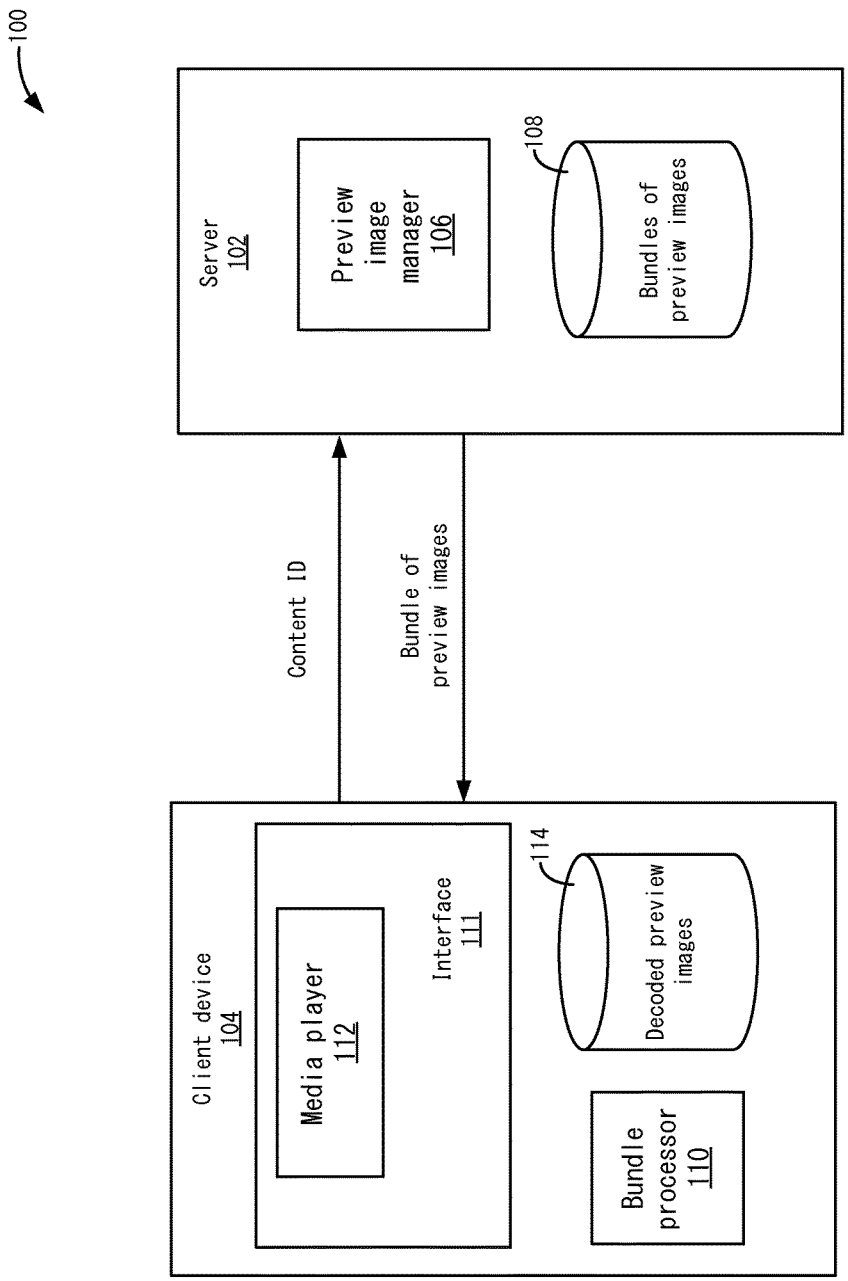
FIG. 1 depicts a simplified system for providing preview images according to one embodiment.

FIG. 1 depicts a simplified system 100 for providing preview images according to one embodiment. System 100 includes a server 102 and a client device 104. However, it will be understood that multiple client devices 104 and servers 102 may be provided. Server 102 may send media programs (e.g., videos) for display on client device 104 in addition to the bundle of preview images. In another embodiment, separate servers may send videos for display on client device 104 and the bundle.

Server 102 includes a preview image manager 106 that can determine a bundle of preview images that are stored in storage 108 to send to client device 104. Alternatively, preview image manager 106 may generate a bundle of preview images dynamically based on settings determined for the bundle. For example, if client device 104 requests a bundle of preview images of a certain frequency or quality, and if a bundle with these settings is not stored in storage 108, preview image manager 106 may generate this bundle dynamically. Each bundle stored in storage 108 may be generated according to certain settings, such as by frequency or quality. Also, a media program may have multiple bundles of different frequencies and quality generated. This allows server 102 to match different bundles to different client devices 104 that may be experiencing different network conditions. Also, client devices 104 may have different processing capabilities and be sent different bundles (e.g., a less powerful client device may be sent preview images of a lower quality).

In one embodiment, when client device 104 wants to play a media program, client device 104 may send a content ID for a media program to server 102. Any settings for a bundle of preview images may also be included with the request that includes the content ID. In some cases, the request may not include settings, and preview image manager 106 may determine a default bundle of preview images to send to client device 104. For example, the default may be a bundle that includes one preview image per second for the media program. Also, how preview image manager 106 processes different settings will be described in more detail below.

Once preview image manager 106 determines the bundle to send, preview image manager 106 retrieves the bundle of preview images from storage 108 and starts to send the bundle to client device 104. When a bundle processor 110 in client device 104 starts to receive the bundle of preview images, bundle processor 110 may start to decode the images when the bundle is first received instead of waiting for the entire bundle to be received. For example, bundle processor 110 decodes the bundle of preview images into separate, individual, per-second images. Once preview images have been decoded, bundle processor 110 stores the images in storage 114 (e.g., local memory).

This allows a media player 112 in interface 111 to display a preview image even when the entire bundle of preview images has not been received. For example, as discussed above, media player 112 may display one of the preview images when a seek request is received even when client device 104 has no received the entire bundle file. During playback of the media program, media player 112 may receive a command from the user who is scrubbing a content playback timeline. For example, as described above, a user may hold and drag his/her finger or another object across the content playback timeline on the user interface (e.g., media player 112 in interface 111) that is playing the media program. Media player 112 displays a user interface widget that includes a preview image in response to the scrubbing if the preview image has been decoded from the bundle. For example, media player 112 can determine that a preview image should be displayed in the user interface widget. Then, media player 112 determines if the preview image has been decoded, and if so, media player 112 retrieves the preview image from the storage 114 and displays the image within the user interface widget.

Bundle processor 110 may also perform other actions, such as determining settings for the bundle of preview images. For example, bundle processor 110 may determine a frequency of the images in the bundle or the quality of the images to be sent. Bundle processor 110 may determine the settings based on various factors, such as the available bandwidth or the processing capabilities of client device 104. For example, if the available bandwidth is low, bundle processor 110 may select a bundle with a lower frequency of images, such as 6 images per minute instead of 60, or a lower quality, such as a 50% quality that returns images with a reduced image quality. This may allow client device 104 to receive the bundle of preview images faster and also decode the bundle faster.

Particular embodiments may send a bundle of preview images before the user interface receives a command to scrub the playback timeline. For example, preview image manager 106 may generate or retrieve a bundle of preview images when client device 104 loads the media program or requests transmission of the media program. Server 102 then responds with a bundle file that includes the bundle of preview images. In one embodiment, the bundle of preview images may take time to be received by client device 104 and also be decoded. For example, client device 104 may start playing the media program and receive a command from the user scrubbing across the content timeline to a new time. At this point, client device 104 may determine that a preview image should be shown corresponding to the new time. Because the bundle of preview images may not have been completely received and/or decoded, client device 104 may not be able to display a preview image. However, particular embodiments may optimize the bundle of image communication process such that preview images may be displayed. In one embodiment, client device 104 may not wait until the full bundle of preview images has been received to decode the images. For example, client device 104 decodes images as parts of the bundle arrive. In this case, client device 104 may be able to display a preview image even though the full bundle has not been received.

Figure 2:
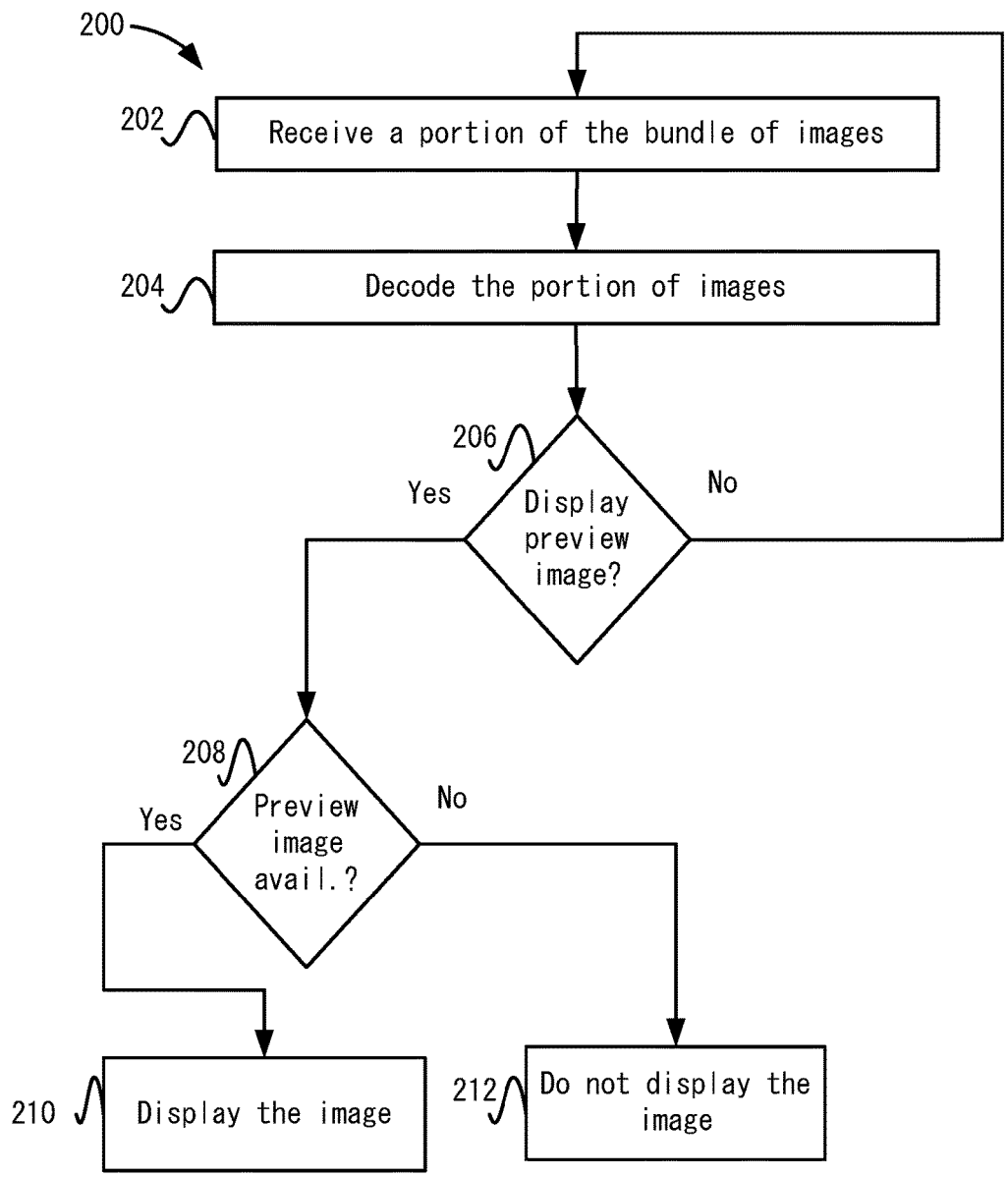
FIG. 2 depicts a simplified flowchart of a method for displaying preview images when a bundle of preview images has not been fully received according to one embodiment.

FIG. 2 depicts a simplified flowchart 200 of a method for displaying preview images when a bundle of preview images has not been fully received according to one embodiment. At 202, client device 104 receives a portion of the bundle of preview images. For example, client device 104 receives encoded data for individual preview images. At 204, client device 104 starts to decode the received preview images.

While the bundle of preview images has not been fully received, client device 104 may determine whether a preview image should be displayed at 206. For example, as described above, the user may scrub the content timeline to a seek time on the timeline. If client device 104 does not determine that a preview image should be displayed, then the process reiterates to 202 where bundle processor 110 continues to receive and decode preview images in the bundle as they are received.

If client device 104 determines that a preview image should be displayed, at 208, client device 104 determines if a preview image corresponding to the position of the seek time has been decoded. For example, a preview image close to the position of the seek time, such as a within a second of the seek time may be eligible as a preview image. As described above, the bundle of preview images may include an image for every second of the video. However, it may be desirable to allow client device 104 to receive a different frequency of images. For example, instead of receiving an image for every second, an image every tenth image (e.g. six images per minute instead of sixty images per minute) can be included in the bundle of preview images. This would allow client device 104 to more quickly decode the images. However, the preview image may not be as precise. For example, client device 104 may display a preview image that is 3 seconds away from the position of the seek time rather than a preview image that is within 1 second of the position. A threshold may be used to determine an eligible preview image, such as a decoded preview image within ten seconds of the seek time may be acceptable.

If an eligible preview image has been decoded, at 210, media player 112 retrieves and displays the preview image from storage 114. However, if a preview image has not been decoded, at 212, media player 112 may perform some other action, such as media player 112 does not display the preview image or requests the preview image from server 102. For example, instead of not displaying the image, client device 104 sends a request to server 102 requesting an image that corresponds to the position of the seek time. That is, client device 104 sends the current media program ID and a time offset to server 102. Server 102 may return a preview image to client device 104 in response. Then, media player 112 can display the preview image.

Figure 3:
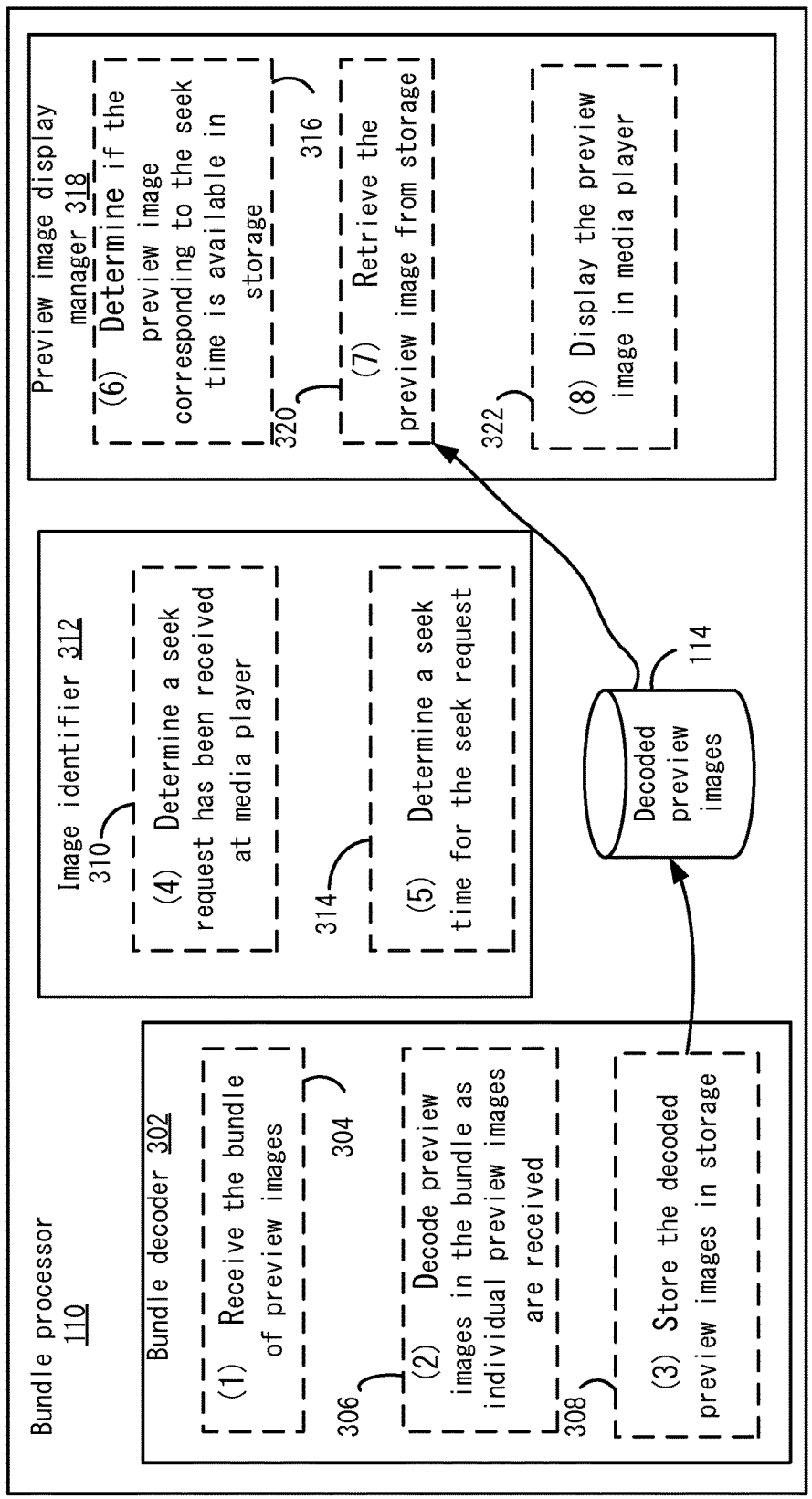
FIG. 3 depicts a more detailed example of a bundle processor according to one embodiment.

The processing of the bundle at client device 104 will now be described in more detail. FIG. 3 depicts a more detailed example of bundle processor 110 according to one embodiment. A bundle decoder 302 decodes the bundle of preview images as the bundle is received. For example, in a step 1 (reference #304), bundle decoder 302 receives the bundle of preview images. In one example, preview image manager 106 may send the bundle of preview images to bundle processor 110. The file may be large and may take time to be received and fully decoded by bundle decoder 302. As discussed above, instead of waiting for the full bundle to be received, in a step 2 (reference #306), bundle decoder 302 decodes preview images in the bundle as individual preview images are received. For example, when bundle decoder 302 has received encoded data such that a full image can be decoded, bundle decoder 302 decodes the preview image. In a step 3 (reference #308), bundle decoder 302 stores the decoded preview images in storage 114. The decoded preview images are stored in storage 114 as they are decoded while the bundle of preview images is received. Storage 114 may be local storage on client device 102, such as cache memory or persistent storage. Also, storage 114 may be an external storage drive accessible to client device 104.

As client device 104 receives the bundle of preview images, client device 104 also receives and plays the media program. The user may at some point seek to a different time in the media program. For example, a user may scrub a timeline or progress bar in media player 112 to a different time in the media program. At this point, an image identifier 312 may determine a preview image to display. For example, in a step 4 (reference #310), image identifier 312 determines a seek request has been received at media player 112. In response to the seek request, in a step 5 (reference #312), image identifier 312 determines a seek time for the seek request. The seek time may be a position that is exactly where the user has scrubbed to in the media program or may be a corresponding position substantially similar to the position the user scrubbed to. In one example, image identifier 312 may use the frequency of the preview images in the bundle to determine a time of the closest preview image (or times for multiple preview images that may be acceptable). Different methods may be used to determine the position based on the seek time.

As described above, bundle decoder 302 decodes the bundle as it is received and not all images may have been decoded. In a step 6 (reference #316), preview image display manager 318 determines if the preview image corresponding to the seek time is available in storage 114. For example, preview image display manager 318 may send a request to storage 114 to determine if the preview image for the seek time is available. If not, preview image display manager 318 may perform different actions, such as not displaying a preview image or sending a request to server 102 for the preview image. If the request is sent to server 102, server 102 may respond with the requested image and preview image display manager 318 displays that preview image. Thus, two different ways for displaying a preview image may be provided as the bundle of preview images may be used or client device 104 may request individual or groups of preview images dynamically when the seek request is received.

Assuming that the preview image has been decoded, in a step 7 (reference #320), preview image display manager 318 retrieves the preview image from storage 114. Then, in a step 8 (reference #322), preview image display manager 318 displays the preview image in media player 112. For example, preview image display manager 318 displays the preview image in an interface widget near the timeline or progress bar in media player 112. This allows a user to see an image of the media program to decide whether to seek to that position.

Figure 4:
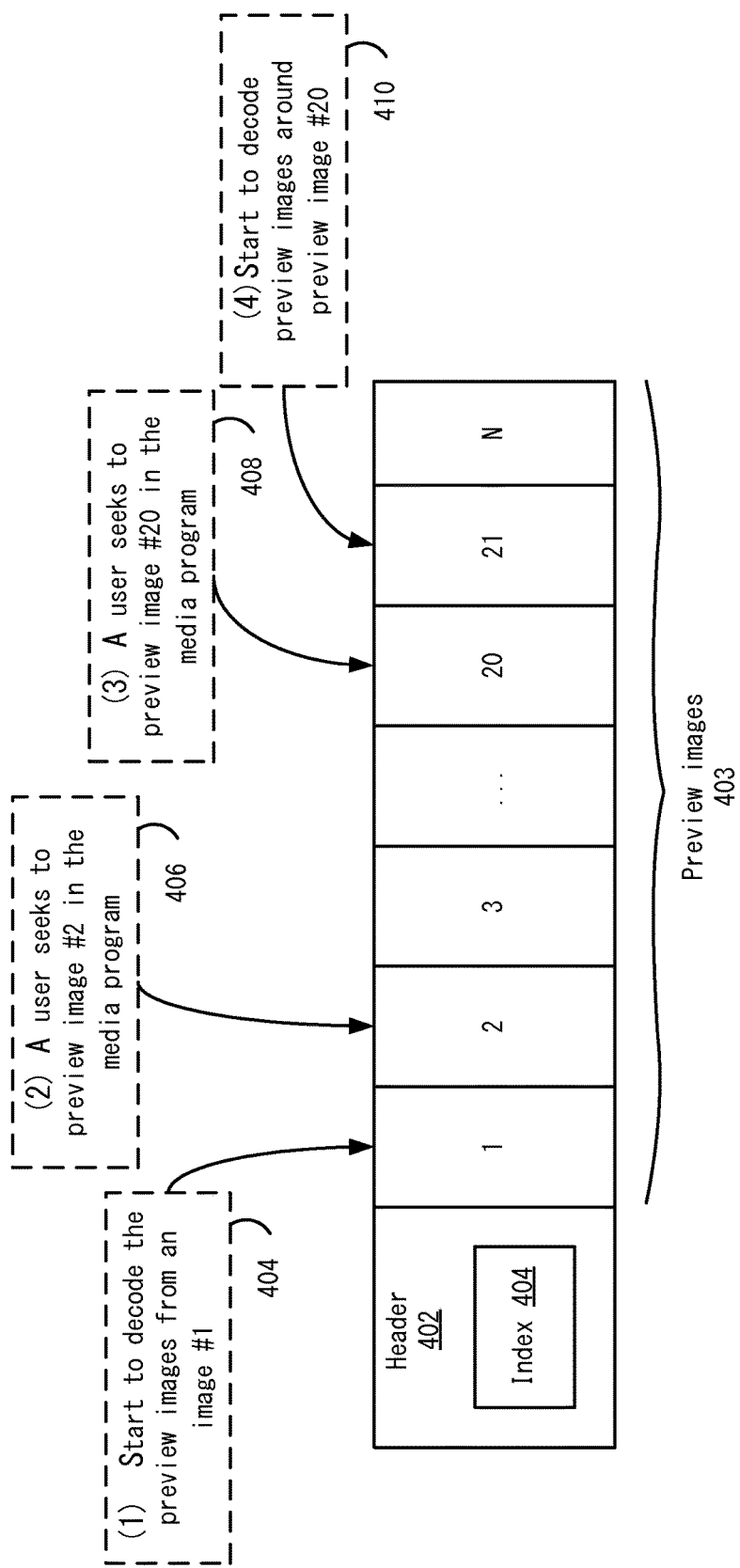
FIG. 4 depicts an example of a bundle of preview images according to one embodiment.

FIG. 4 depicts an example of a bundle of preview images according to one embodiment. The bundle of preview images may be stored as a file or other unit of storage. In one embodiment, a header 402 may be included in the bundle of preview images. The header may identify which media program the bundled preview images is associated with and may also include an index 404 that indicates where each preview image is in the bundle. For example, an index 404 may indicate a bit position for the start of each preview image. That is, the encoded information is a series of bits. The index indicates a bit position in the file where the encoded information for each preview image starts. Index 404 may also indicate other position information, such as the number of bits of each image, a range of bits in which each preview image resides, or other information that allows bundle processor 110 to determine a position of each preview image in the bundle. Bundle processor 110 may use index 404 to jump to different preview images to decode.

The bundle also includes preview images 1-N shown at 403. When bundle processor 110 receives the bundle, bundle processor 110 may decode the preview images in sequential order as they are received from the beginning of the bundle. For example, preview image #1 may be an image for the first second of the media program; image #2 may be a preview image for a second preview image of the media program, and so on.

In one example, in a step 1 (reference #404), bundle processor 110 starts to decode the preview images starting from an image #1. At some point, the user may seek to a different position in the media program. For example, at a step 2 (reference #406), a user seeks to preview image #2 in the media program. For discussion purposes, it is assumed that bundle processor 110 has decoded preview image #2. In this case, bundle processor 110 may retrieve preview image #2 from storage 114, and display preview image #2 in media player 112.

However, in a step 3 (reference #408), a user may seek to a preview image #20. In this case, bundle processor 110 may not have decoded preview image #20 yet. In this case, bundle processor 110 may not display a preview image. Or, as discussed above, bundle processor 110 may request the preview image from server 102.

Even though bundle processor 110 may not be able to display a preview image, bundle processor 110 may optimize the decoding process based on the seek request to preview image #20. For example, if the user decides to seek a time corresponding to preview image #20 in the media program, the media program will begin playing in that position. If bundle processor 110 was decoding the preview images in a sequential order, preview image #3 may be processed next. However, it may not be likely that the user seeks to preview image #3. Rather, it is more likely that the user seeks to images around preview image #20. Thus, after bundle processor 110 determines that the user has seeked to preview image #20, in a step 4 (reference #410), bundle processor 110 may start to decode preview images around preview image #20. For example, bundle processor 110 may start to decode preview images after preview image #20, such as starting with a preview image #21. Also, because a user may seek in both directions, bundle processor 110 may start to decode preview images in the opposite direction, such as starting with a preview image #19 and continuing with earlier preview images in the media program. By decoding images around a position the media program is playing, bundle processor 110 may be more likely to have decoded a preview image when a user seeks again to a different position because the user may more likely seek to a position around the current position of the media program. Index 404 in header 402 allows bundle processor 110 to jump to decoding different preview images in the bundle of preview images. For example, bundle processor 110 may determine a bit location using index 404 and start decoding at that position.

Figure 5:
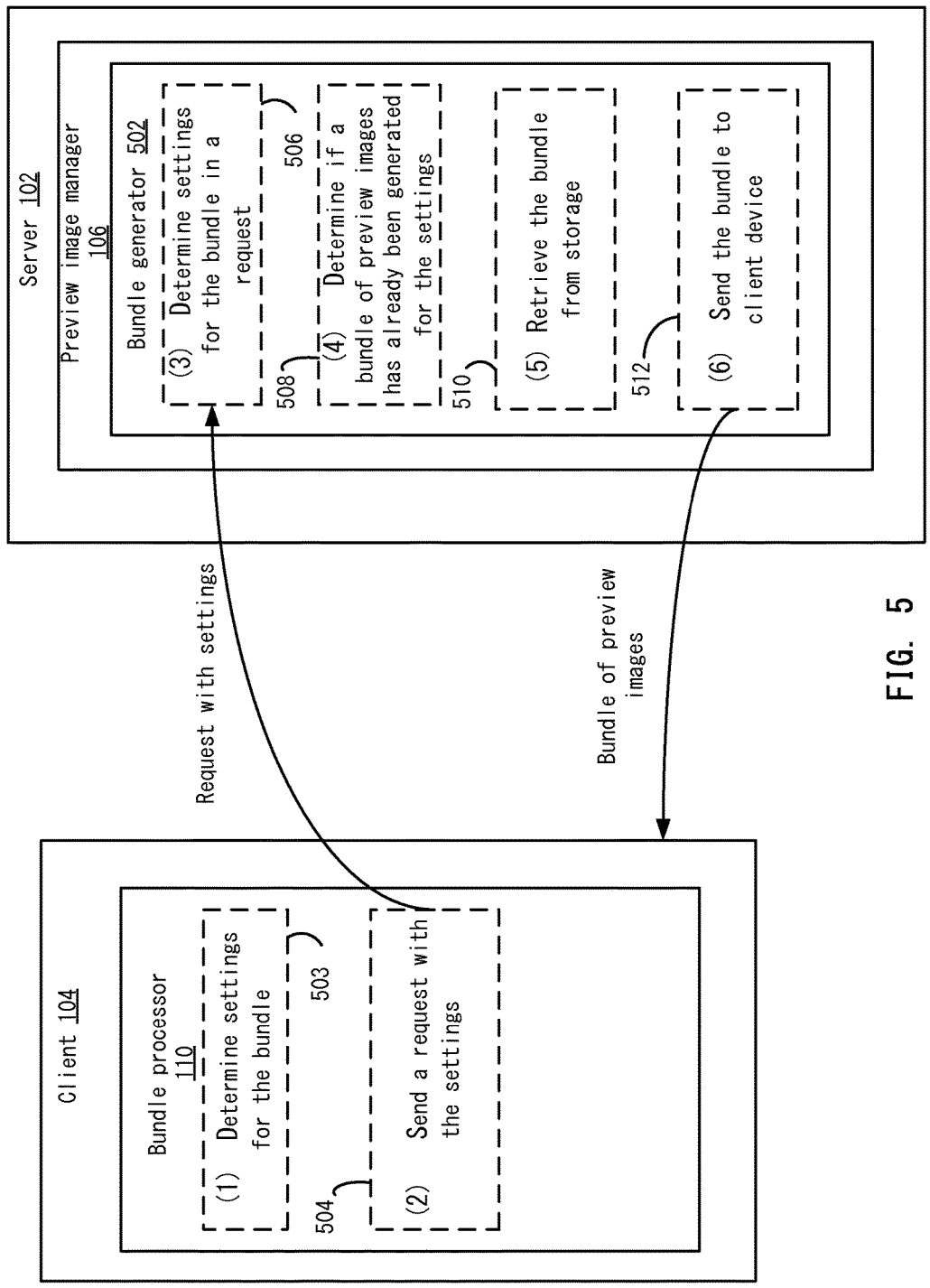
FIG. 5 depicts a more detailed example of the system for requesting different settings for the bundle according to one embodiment.

As described above, client device 104 may request different settings for the bundle of preview images, such as a different frequency of images or a different quality of preview images according to one embodiment. FIG. 5 depicts a more detailed example of system 100 for requesting different settings for the bundle according to one embodiment. In a step 1 (reference #503), bundle processor 110 may determine settings for the bundle. In one embodiment, bundle processor 110 may use default settings. In this case, bundle processor 110 may not need to send any settings to server 102. Then, server 102 may send a standard default bundle, such as a bundle of preview images for every second of the media program. However, in other cases, bundle processor 110 may analyze characteristics to request settings for the bundle. As will be discussed in more detail below, bundle processor 110 may analyze the available bandwidth to determine whether a lower frequency of preview images or a lower quality should be requested. Also, as will be discussed in more detail below, it is possible for bundle processor 110 to request a bundle of preview images of a lower frequency first or a lower quality that can be decoded first, and then a higher quality or higher frequency bundle of preview images can be requested/received after that. Also, server 102 may analyze the characteristics and determine the settings. Server 102 may send the settings to client device 104 for inclusion in the request, if needed.

Once the settings are determined, in a step 2 (reference #504), bundle processor 110 sends a request with the settings. For example, bundle processor 110 may send a request with the content ID to server 102 and include a request for the bundle with the settings.

In server 102, in a step 3 (reference #506), a bundle generator 502 in preview image manager 106 determines settings for the bundle in a request. In a step 4 (reference #508), bundle generator 502 determines if a bundle of preview images has already been generated for the settings. For example, bundle generator 502 may pre-generate different bundles for different settings. Or, in other cases, as different requests are received for different settings, bundle generator 502 may generate the bundles dynamically when the request is received and store the generated bundles for later use.

If the bundle exists, in a step 5 (reference #510), bundle generator 502 retrieves the bundle from storage 108. However, if the bundle has not been generated, bundle generator 502 dynamically generates the bundle of preview images according to the settings. For example, bundle generator 502 may generate a bundle of preview images at the requested frequency or quality. Once the bundle has been retrieved or generated, in a step 6 (reference #512), bundle generator 502 sends the bundle to client device 104.

Figure 6:
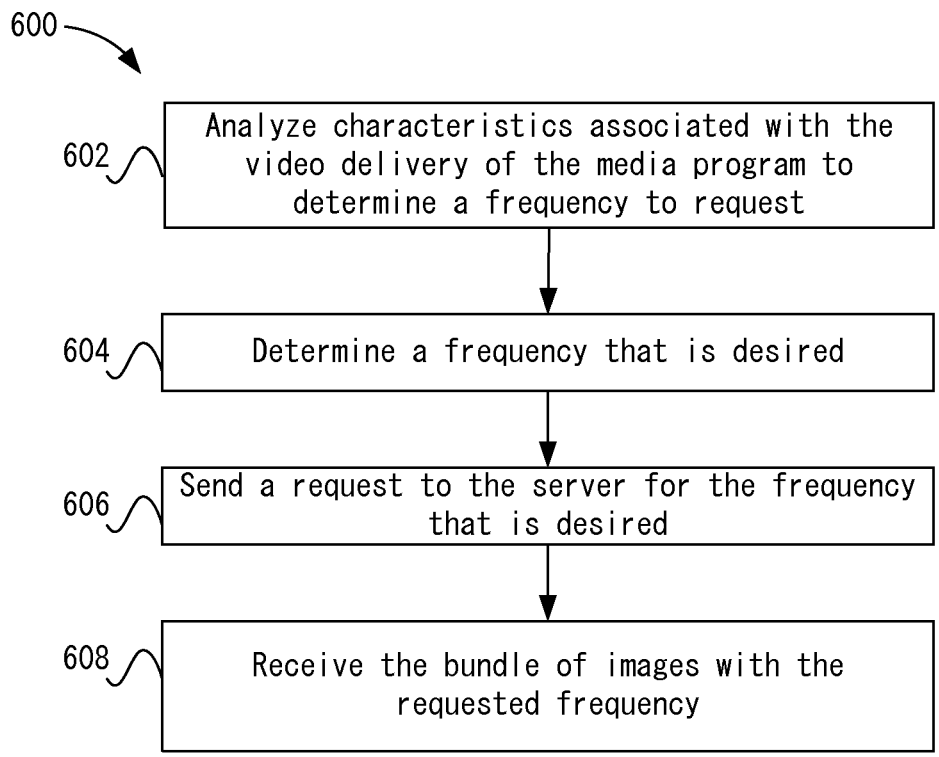
FIG. 6 depicts a simplified flowchart of a method for requesting a different frequency of images according to one embodiment.

In one embodiment, an application programming interface (API) in server 102 allows client device 104 to request a bundle with varying frequencies of images. FIG. 6 depicts a simplified flowchart 600 of a method for requesting a different frequency of images according to one embodiment. At 602, client device 104 analyzes characteristics associated with the video delivery of the media program to determine a frequency to request. For example, the characteristics include the video content, available bandwidth, or client processing power. In one embodiment, client device 104 determines the frequency based on the duration of the media program. In one example, if the content is 30 seconds long, client device 104 may determine that a one second frequency is desired. However, if the content is 60 seconds long, client device 104 may determine that a two second frequency is desired. The two second frequency delivers a smaller file than the one second frequency as images every two seconds are included in the bundle. Additionally, for even longer content, client device 104 may request other frequencies, such as up to a cap of a 10-second frequency. So, once the content reaches a certain duration (e.g., 5 minutes), the longest frequency available would be a 10-second frequency.

At 604, client device 104 determines a frequency that is desired. At 606, client device 104 sends a request to server 102 for the frequency that is desired. For example, client device 104 sends a request through the API to server 102. Server 102 may then dynamically generate a bundle of preview images according to the requested frequency. In another embodiment, server 102 may retrieve a pre-generated file for the bundle of preview images according to the frequency requested. In this case, files with different frequencies may be stored at server 102. At 608, client device 104 receives the bundle of preview images with the requested frequency.

Figure 7:
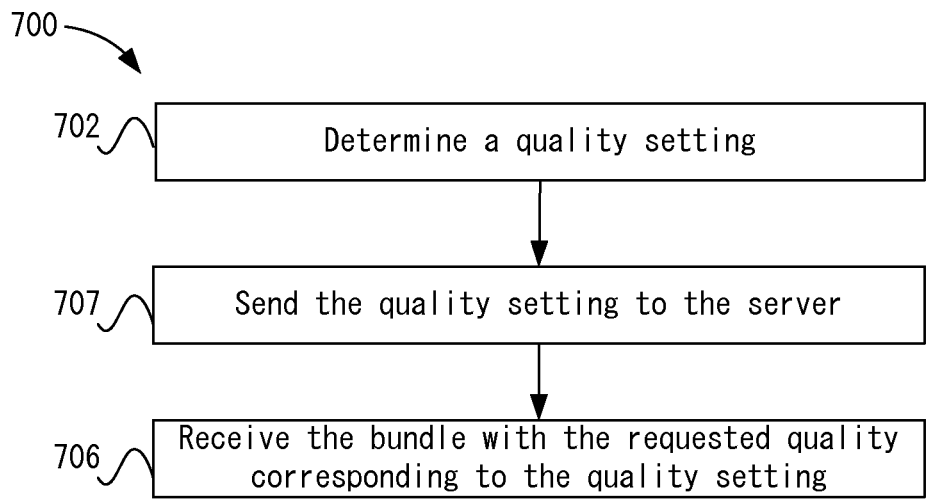
FIG. 7 depicts a simplified flowchart of a method for determining the quality to request according to one embodiment.

In addition to allowing the frequency to be controlled, the API at server 102 may also allow the image quality to be controlled. For example, client device 104 may request a different quality of images in the bundle. FIG. 7 depicts a simplified flowchart 700 of a method for determining the quality to request according to one embodiment. At 702, client device 104 determines a quality setting. The different quality settings may be determined based on various video delivery factors, such as available bandwidth, the video content, or the client device processing power. For example, client device 104 may request a lower quality for a longer media program. The quality setting may be modeled as an absolute quality percentage or as a multiplier/factor to a quality algorithm or setting within client device 104. In one embodiment, server 102 may send the quality setting to client device 104 when the video is requested. In this way, server 102 may control the quality that client device 104 requests. Also, allowing server 102 to send the quality setting to client device 104 allows the quality to be changed without reconfiguring client device 104. In other embodiments, client device 104 may determine the quality setting dynamically. An example of this embodiment will be described in more detail below.

At 704, client device 104 sends the quality setting to server 102. If client device 104 requests the 100% quality, server 102 may return the bundle of preview images with a highest quality. However, if client device 104 requests a 50% quality, then server 102 may return a bundle of preview images with a reduced quality, such as a lower resolution than the highest quality bundle of preview images. In one embodiment, server 102 may regenerate the bundle of preview images with a reduced quality dynamically. In another embodiment, server 102 may retrieve a bundle of preview images that has been previously stored with a lower quality. At 706, client device 104 receives the bundle with the requested quality corresponding to the quality setting.

As described above, client device 104 may dynamically request the quality. For example, client device 104 may request a bundle of preview images of a different quality based on a connection speed or connection type. Client device 104 may determine the speed of a connection and request an appropriate level of quality. For example, when using as third generation (3g) or fourth generation (4g) mobile broadband connection, client device 104 requests a first level of quality, such as 25%. However, if client device 104 is using a faster connection, such as a WiFi connection, client device 104 would request a higher quality of 60%.

In one embodiment, due to the ability to provide bundles of images at different qualities, particular embodiments may optimize the sending of bundles to client device 104. For example, in the beginning of sending of the content stream to client device 104, server 102 sends a much less frequent and lower quality bundle to client device 104. This allows client device 104 to more quickly decode the bundle of preview images. Thus, if client device 104 receives a command to scrub the timeline when the video first starts to play, there's a better chance that client device 104 has decoded the video.

After sending the less frequent and lower quality bundle to client device 104, server 102 follows with a more granular and higher quality bundle of preview images to client device 104. Client device 104 can then subsequently decode the more granular and higher quality bundle. This allows a user watching a very long piece of content, such as a movie, to scrub the content timeline and receive preview images for that content sooner, but with much less frequent images and with a lower preview quality. However, as the content continues to play, the lower quality and less frequent preview images are replaced with higher quality preview images that are more frequent as client device 104 decodes the higher quality bundle.

System Overview

Figure 8:
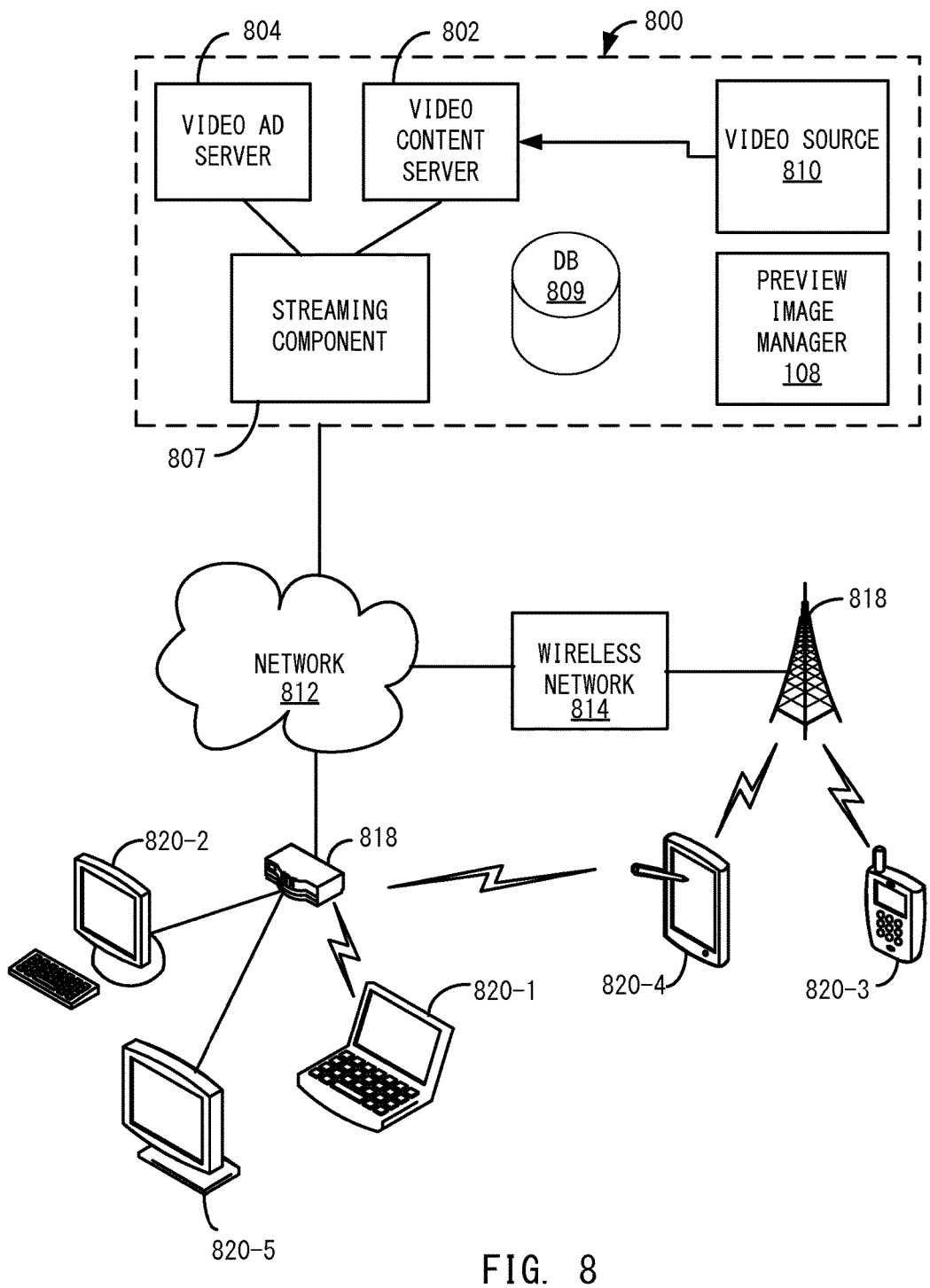
FIG. 8 depicts a video streaming system in communication with multiple client device devices via one or more communication networks.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The video advertising server 804 may serve the video advertising segments as directed by a user interface controller (not shown).

The video streaming system 800 also may include preview image manager 106. As discussed above, preview image manager 106 may communicate with bundle processor 110 to request a bundle of preview images.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812 and/or other network 814. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 818 for a wireless telephony network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
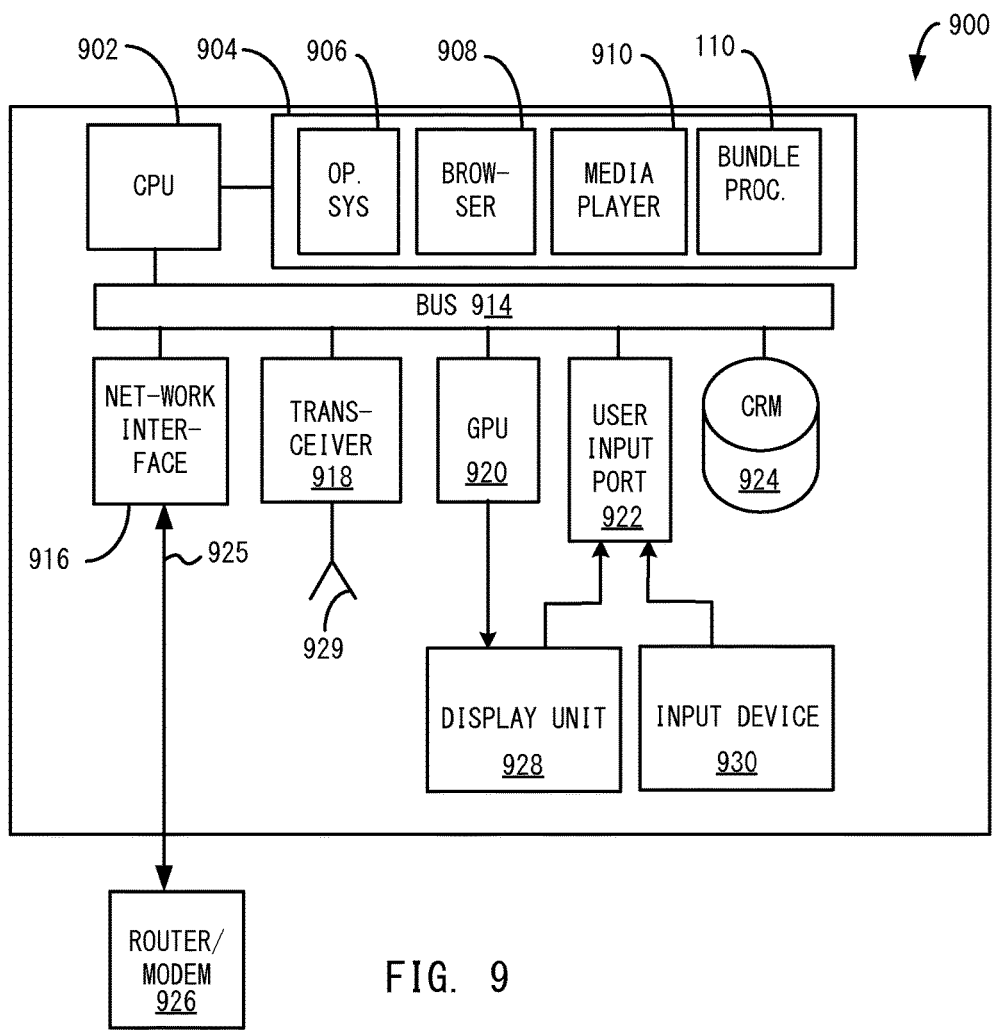
FIG. 9 depicts a diagrammatic view of an apparatus for viewing video content.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include bundle processor 110. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   sending, by a computing device, a request for a bundle of preview images for a video to a server;
   starting, by the computing device, to play the video, wherein the bundle of preview images is separate from the video;
   receiving, by the computing device, a portion of the bundle of preview images for the video;
   prior to receiving an input from a user for a location in the video that is different from a current position being played for the video, decoding, by the computing device, the portion of the bundle of preview images sequentially from a beginning of the bundle of preview images before the entire bundle of preview images is received while the video is received and played;
   receiving, by the computing device, the input from the user for the location in the video that is different from the current position being played for the video;
   upon receiving the input, determining, by the computing device, if a preview image corresponding to the location has been decoded from the bundle of preview images;
   when the image corresponding to the location has been decoded, displaying, by the computing device, the preview image corresponding to the location as a preview image for the location while displaying the video being played;
   when the image corresponding to the location has not been decoded, performing, by the computing device, an action designated for when the preview image corresponding to the location has not been decoded; and
   after displaying the preview image or performing the action, switching, by the computing device, from decoding the bundle of preview images sequentially from the beginning to decoding preview images from the bundle of preview images in both a forward direction and a reverse direction from the location.

2. The method of claim 1, wherein the preview image is displayed without the entire bundle of preview images being received.

3. The method of claim 1, wherein decoding comprises:
decoding the portion of the bundle of preview images sequentially starting with a first image;
determining a second image in the portion of the bundle of preview images based on the location; and
starting to decode the portion of the bundle of preview images based on the second image, the second image not being sequentially located from an image last decoded.

4. The method of claim 3, wherein an index associated with the bundle of preview images is used to determine where the second image is located in the bundle of preview images.

5. The method of claim 1, further comprising:
determining settings for the bundle of preview images; and
sending the settings to the server, wherein the bundle of preview images is determined by the server based on the settings.

6. The method of claim 1, further comprising:
determining a frequency setting of preview images for the bundle of preview images; and
sending the frequency setting to the server, wherein a frequency of preview images from the video is determined by the server for the bundle of preview images based on the frequency setting.

7. The method of claim 1, further comprising:
determining a quality setting for the preview images in the bundle of preview images; and
sending the quality setting to the server, wherein a quality of preview images from the video is determined by the server for the bundle of preview images based on the quality setting.

8. The method of claim 1, wherein the bundle of preview images comprises a first bundle of preview images, and wherein receiving the portion comprises receiving the portion at a first frequency or a first quality, the method further comprising:
receiving a second bundle of preview images at a second frequency or a second quality after receiving the first bundle of preview images.

9. The method of claim 1, wherein performing the action designated for when the preview image corresponding to the location has not been decoded comprises:
sending a request for the image corresponding to the location to the server;
receiving the image in response to the request; and
displaying the image as the preview image.

10. A non-transitory computer-readable storage medium containing instructions, that when executed, control a computer system to be configured for:
sending a request for a bundle of preview images for a video to a server;
starting to play the video, wherein the bundle of preview images is separate from the video;
receiving a portion of the bundle of preview images for the video;
prior to receiving an input from a user for a location in the video that is different from a current position being played for the video, decoding the portion of the bundle of preview images sequentially from a beginning of the bundle of preview images before the entire bundle of preview images is received while the video is received and played;
receiving the input from the user for the location in the video that is different from the current position being played for the video;
upon receiving the input, determining if a preview image corresponding to the location has been decoded from the bundle of preview images;
when the image corresponding to the location has been decoded, displaying the preview image corresponding to the location as a preview image for the location while displaying the video being played;
when the image corresponding to the location has not been decoded, performing an action designated for when the preview image corresponding to the location has not been decoded; and
after displaying the preview image or performing the action, switching from decoding the bundle of preview images sequentially from the beginning to decoding preview images from the bundle of preview images in both a forward direction and a reverse direction from the location.

11. The non-transitory computer-readable storage medium of claim 10, wherein the preview image is displayed without the entire bundle of preview images being received.

12. The non-transitory computer-readable storage medium of claim 10, wherein decoding comprises:
decoding the portion of the bundle of preview images sequentially starting with a first image;
determining a second image in the portion of the bundle of preview images based on the location; and
starting to decode the portion of the bundle of preview images based on the second image, the second image not being sequentially located from an image last decoded.

13. The non-transitory computer-readable storage medium of claim 12, wherein an index associated with the bundle of preview images is used to determine where the second image is located in the bundle of preview images.

14. The non-transitory computer-readable storage medium of claim 10, further configured for:
determining settings for the bundle of preview images; and
sending the settings to the server, wherein the bundle of preview images is determined by the server based on the settings.

15. The non-transitory computer-readable storage medium of claim 10, further configured for:
determining a frequency setting of preview images for the bundle of preview images; and
sending the frequency setting to the server, wherein a frequency of preview images from the video is determined by the server for the bundle of preview images based on the frequency setting.

16. The non-transitory computer-readable storage medium of claim 10, further configured for:
determining a quality setting for the preview images in the bundle of preview images; and
sending the quality setting to the server, wherein a quality of preview images from the video is determined by the server for the bundle of preview images based on the quality setting.

17. The non-transitory computer-readable storage medium of claim 10, wherein the bundle of preview images comprises a first bundle of preview images, and wherein receiving the portion comprises receiving the portion at a first frequency or a first quality, further configured for:

receiving a second bundle of preview images at a second frequency or a second quality after receiving the first bundle of preview images.

18. The non-transitory computer-readable storage medium of claim 10, wherein performing the action designated for when the preview image corresponding to the location has not been decoded comprises:
sending a request for the image corresponding to the location to the server;
receiving the image in response to the request; and
displaying the image as the preview image.

19. A method comprising:
determining, by a computing device, a request for a bundle of preview images for a video, wherein the bundle of preview images is separate from the video;
sending, by the computing device, the video to a client device for playing; and
sending, by the computing device, a portion of the bundle of preview images for the video, wherein prior to receiving an input from a user for a location in the video that is different from a current position being played for the video, the client device starts to decode the portion of the bundle of preview images sequentially from a beginning of the bundle of preview images before the entire bundle of preview images is received while the video is received and played; displays a preview image corresponding to a location that a user seeked to in the video that is different from a current position being played for the video as a preview image for the location while displaying the video being played when, upon receiving an input from the user, it is determined that an image corresponding to the location has been decoded from the bundle of preview images; when the image corresponding to the location has not been decoded, performs an action designated for when the preview image corresponding to the location has not been decoded; and after displaying the preview image or performing the action, switches from decoding the bundle of preview images sequentially from the beginning to decoding preview images from the bundle of preview images in both a forward direction and a reverse direction from the location.

20. The method of claim 19, further comprising:
determining settings for the bundle of preview images; and
determining the bundle of preview images based on the settings.

21. The method of claim 20, wherein determining the bundle of preview images based on the settings comprises:
retrieving a pre-generated bundle of preview images based on the settings.

22. The method of claim 21, wherein determining the bundle of preview images based on the settings comprises:
dynamically generating the bundle of preview images based on the settings after determining the settings.

23. The method of claim 21, wherein the bundle of preview images is determined based on a frequency of preview images from the video or a quality of preview images from the video.

24. The method of claim 19, wherein the bundle of preview images comprises a first bundle of preview images, and wherein sending the portion comprises sending the portion at a first frequency or a first quality, the method further comprising:
sending a second bundle of preview images at a second frequency or a second quality after receiving the first bundle of preview images.

* * * * *